UNITED STATES PATENT OFFICE.

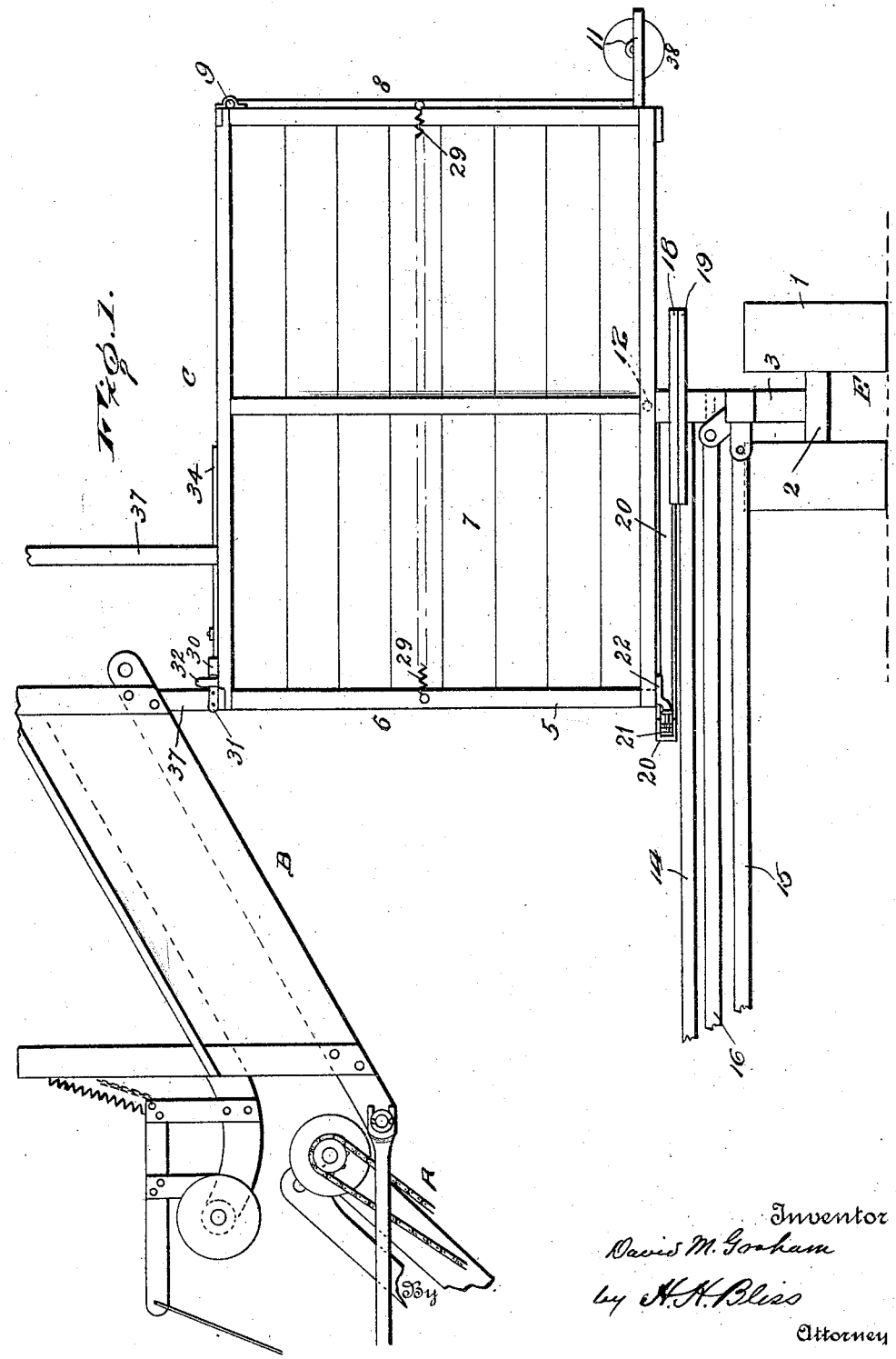

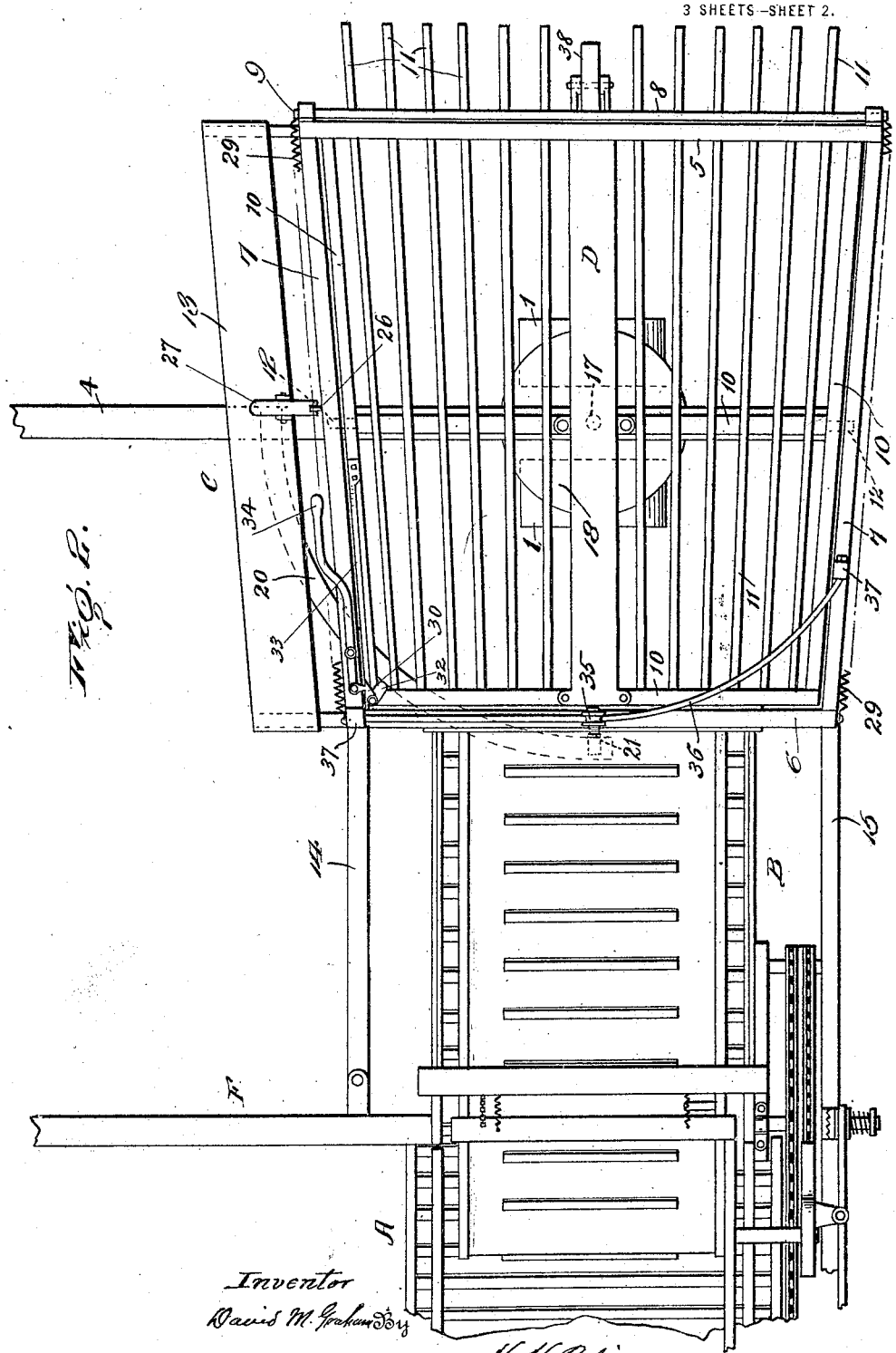

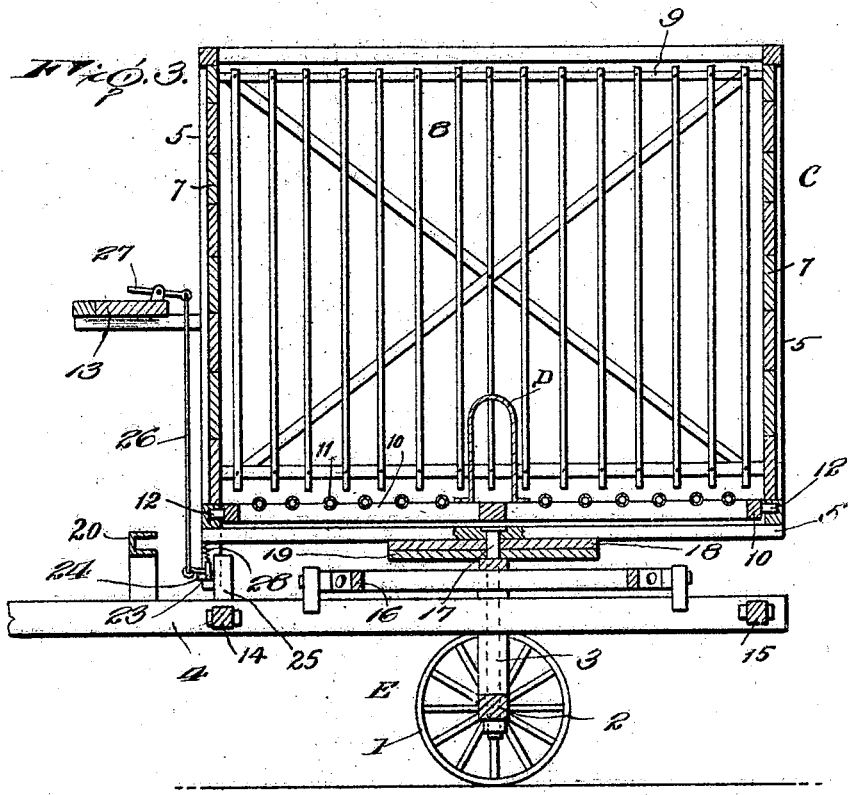

DAVID M. GRAHAM, OF BORDULAC, NORTH DAKOTA, ASSIGNOR TO GRAHAM-ROACH HARVESTER AND STACKER COMPANY, A CORPORATION OF NORTH DAKOTA.

APPARATUS FOR FORMING AND DEPOSITING STACKS OF GRAIN AND THE LIKE.

1,377,336. Specification of Letters Patent. Patented May 10, 1921.

Application filed May 20, 1918. Serial No. 235,547.

*To all whom it may concern:*

Be it known that I, DAVID M. GRAHAM, a citizen of the United States, residing at Bordulac, in the county of Foster and State of North Dakota, have invented certain new and useful Improvements in Apparatus for Forming and Depositing Stacks of Grain and the like, of which the following is a specification, reference being had therein to the accompanying drawing.

The invention relates to stacking apparatus adapted to receive grain as it is cut, or otherwise form the same into stacks and deposit the latter upon the ground for the curing of the grain berries, such curing process being more particularly set forth in my application Serial No. 47,256, filed Aug. 25, 1915.

The present invention is directed particularly to the easy and smooth deposit of the stack from the former while the latter is in motion, ordinarily attached to or accompanying a grain harvesting mechanism, and without disarranging or misshaping the formed stack. By so depositing the stack I am also enabled to leave it at a greater distance from the standing grain so as to leave plenty of room for the cutting of the same.

With such objects in view the invention comprises a stack former having a wheeled support, upwardly extending walls which shape the exterior of the stack, means for depositing the stack, and a substantially vertical pivotal support whereby the stack former may turn in substantially horizontal planes as may be required to withdraw it smoothly from the stack as the latter is placed upon the ground.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:

Figure 1 is a rear view of a stack former embodying the invention, showing also a portion of a harvester elevator and a grain transporting mechanism from said elevator to the stack former.

Fig. 2 is a plan view of the same.

Fig. 3 is a vertical longitudinal section on line III—III of Fig. 2.

In these figures the stack former is shown in the position in which it receives the grain and forms the stack, and in depositing the stack the stubble end of its bottom tilts downwardly and turns rearwardly in substantially horizontal planes.

Fig. 4 is a perspective view illustrating a latch mechanism which holds the stack former from turning on its vertical pivot.

Fig. 5 is a front view of the lower part of said mechanism.

Fig. 6 is a perspective view illustrating the latch which holds and releases the tilting bottom.

Referring to the drawings, A indicates (Fig. 1) the upper portion of the elevator leading from the cutting apparatus of a harvesting machine, which may be of any usual and suitable character. B indicates a grain transporting device acting to deliver the cut grain, preferably intermittently or in bunches, from said elevator to a stack former C, in the lower portion of which is arranged a ventilating air space former D; the said stack former being mounted to travel with the harvesting mechanism on a wheeled support E comprising wheels 1, and an axle 2 carried by said wheels and arranged transverse to the line of draft of the harvesting apparatus and stack former, vertical supports 3, fixed on said axle, and a longitudinal draft tongue 4 by which the stack former may be caused, by a team of horses or by a tractor, to advance in parallelism with the harvesting apparatus while the latter is engaged in cutting the grain to be stacked.

The stack former comprises a suitable frame 5 which supports an end wall 6, side walls 7, and a movable end wall or gate 8 which in this instance is mounted upon a horizontal hinge 9 to swing outwardly and upwardly for the deposit of a formed stack. The side walls 7 are constructed to incline away from each other in the direction toward the end gate 8 so that the formed stack readily frees itself from said side walls as it is being deposited. The bottom of the stack former is shown at 10 comprising stack-supporting rods or metal pipes 11 which extend in the direction of dumping. At about the median line of said bottom it is provided with pivots 12 (Fig. 3) on which the bottom may tilt for the deposit of a stack, its inner end rising and its outer declining until the outer ends of the rods 11 trail upon the ground as the stack slides out of the former and off from the bottom. The said pivots 12 have bearings in the lower portion of the stack former frame 5.

13 is a platform carried by the frame 5 and serving for a driver and for an operator who may with a fork arrange the grain in the stack former as it is delivered thereto. 14 and 15 indicate links or radius bars by which the wheeled support E and draft frame of the stack former are maintained in parallelism with the harvester frame F, as more particularly set forth in my application Serial No. 223,583, filed March 20, 1918; and this application may be referred to for the details of construction and the mode of operation of the grain transporting device B. 16 is an additional pivoted radius bar operating in parallelism with the bars 14 and 15 and connecting the wheeled support E with the harvester frame to maintain the non-rotary parts of the stack former in proper position during the carrying and dumping of the stack.

The stack former is mounted on a substantially vertical axis so that its delivery end may turn rearward as the stack is deposited, such turning being effected by the retarding of said delivery end when the rods 11 and the end portion of the stack engage with the ground. Such a pivotal axis is or may be formed as illustrated, 17 being a vertical pivot which unites upper and lower bearing plates 18 and 19, in the nature of a fifth wheel, the plate 18 being attached to the lower part of the stack former frame and adapted to turn on the plate 19, the latter being attached to the wheeled support E.

20 is a segmental guide attached to the tongue 4 and having upper and lower flanges (Fig. 3) between which runs a roller 21 having a journal bracket 22 which is attached to the front of the frame 5, whereby the frame is guided in its partial rotation and prevented from tilting. The rear end of the guide 20 holds the roller 21 from rearward movement when the stack former is in normal grain-receiving position and at that time any forward turning of the grain end of the stack former is prevented by a latch 23 (Figs. 4 and 5) which is pivoted on the frame 5 and hooks over a pin 24 fixed on a bracket 25 carried by the tongue, so that under such conditions the stack former cannot turn on its vertical pivot. The latch 23 is released, to permit the stack former to be turned, by a link 26 which connects the latch with a lever or treadle 27 on the platform 13. The latch is pressed downward by a spring 28, and relatches on said pin when the stack former is turned back to normal position after dumping.

The weight of that portion of the stack which is at the outer side of the pivots 12 (at the right hand in Fig. 2) is somewhat greater than the weight of the inner portion of the stack at the other side of the said pivots, so that when the tilting bottom 10 is free to turn on the pivots the stack will be dumped and will at the same time press against and open the end gate 8. The gate will then trail on the top of the stack and thereafter be returned to closed position by springs 29 which connect the gate with the sides of the stack former or with its frame 5. The bottom 10 is held in normal or horizontal position by a latch 30 carried by a spring 31, said spring being fastened to a portion of the frame 5 (Fig. 5). When the bottom is in normal position the latch 30 engages at the outer side of a post 32 which is rigidly secured to the front portion of the bottom 10 and extends up to the top of the stack former. The post 32 is braced by an inclined member 33 which is attached to said post at its upper end and extends down parallel with one of the side walls 7 and is secured at its lower end to the bottom (Fig. 2). The latch 30 is released by a hand lever 34 which is adapted to pull the latch away from in front of the post 32 whereupon the bottom will tilt under the weight of the stack as above described.

The outer end of the grain transporting device B is suspended from a pulley 35 resting upon a track 36. This track is secured to the frame 5 on posts 37 which extend upward therefrom, and the rear portion of the track is curved concentrically with the vertical axis of the pivot 17, so that the device B is properly supported while the stack holder turns on said axis.

38 is a ground wheel attached to the outer end of the bottom 10 and adapted to trail upon the ground when the stack is deposited. This wheel may be a caster wheel as indicated in Fig. 1.

What I claim is:

1. In an apparatus for forming and depositing stacks of grain and the like, the combination of a wheeled support, a stack former mounted and transportable thereon and adapted to receive grain in loose unbound condition and form the same into a relatively solid stack, means for depositing a formed stack from said former, a substantially vertical pivotal connection between said stack former and its support whereon the stack former may turn in substantially horizontal planes to accommodate itself to the stack while the latter is being deposited, including a bottom which is tiltable downward relative to the upstanding walls of the stack former.

2. In an apparatus for forming and depositing stacks of grain and the like, the combination of a wheeled support, a stack former mounted and transportable thereon and adapted to receive grain in loose unbound condition and form the same into a relatively solid stack, a ventilating air space former carried with said stack former, means for depositing a formed stack from said former, a substantially vertical pivotal connection between said stack former and its support whereon the stack former may turn in substantially horizontal planes to accommodate itself to the stack while the latter is being deposited, and means for holding the stack former from rotation and with its end, through which the stack is deposited, at one side relative to the line of draft of said wheeled support during the forming of the stack.

3. In an apparatus for forming and depositing stacks of grain and the like, the combination of a wheeled support, a stack former extending laterally beyond said wheeled support and mounted and transportable thereon and adapted to receive grain in loose unbound condition and form the same into a relatively solid stack, pivotal connections for movably holding said stack former to a harvesting apparatus, a ventilating air space former carried with said stack former, means for depositing a formed stack from said former, and a substantially vertical pivotal connection between said stack former and its support whereon the stack former may turn in substantially horizontal planes to accommodate itself to the stack while the latter is being deposited.

4. In an apparatus for forming and depositing stacks of grain and the like, the combination of a wheeled support, a stack former mounted and transportable thereon and having its side walls inclined away from each other transversely to the line of draft toward the delivery end and adapted to receive grain in loose unbound condition and form the same into a relatively solid stack, a ventilating air space former carried with said stack former, means for depositing a formed stack from said former, and a substantially vertical pivotal connection between said stack former and its support whereon the stack former may turn in substantially horizontal planes to accommodate itself to the stack while the latter is being deposited.

5. In an apparatus for forming and depositing stacks of grain and the like, the combination of a wheeled support, a stack former mounted and transportable thereon and having its side walls inclined away from each other transversely to the line of draft toward the delivery end of the former and adapted to receive grain in loose unbound condition and form the same into a relatively solid stack, and means for depositing a formed stack from said former.

6. In an apparatus for forming and depositing stacks of grain and the like, the combination of a wheeled support, a stack former mounted and transportable and vertically pivoted thereon and having its side walls inclined away from each other transversely to the line of draft toward the delivery end of the former and adapted to receive grain in loose unbound condition and form the same into a relatively solid stack, and means for depositing a formed stack from said former.

7. In an apparatus for forming and depositing stacks of grain and the like, the combination of a wheeled support, a stack former mounted and transportable thereon and having its side walls inclined away from each other transversely to the line of draft toward the delivery end of the former and adapted to receive grain in loose unbound condition and form the same into a relatively solid stack, said stack former having a downwardly movable bottom for depositing a formed stack from said former, and a ventilating air space former carried with said stack former.

8. In an apparatus for forming and depositing stacks of grain and the like, the combination of a wheeled support, a stack former mounted and transportable thereon and adapted to receive grain in loose unbound condition and form the same into a relatively solid stack, a tiltable bottom for depositing a formed stack from said former, and a substantially vertical pivotal connection between said stack former and its support whereon the stack former may turn in substantially horizontal planes to accommodate itself to the stack while the latter is being deposited from the tilted bottom.

9. In an apparatus for forming and depositing stacks of grain and the like, the combination of a wheeled support, a stack former mounted and transportable thereon and adapted to receive grain in loose unbound condition and form the same into a relatively solid stack, and means for depositing the stack on the ground toward the side of the stack former and in a diagonal position at the stubble side of the median longitudinal line of the stack former.

10. In an apparatus for forming and depositing stacks of grain and the like, the combination of a wheeled support, a stack former mounted and transportable thereon and adapted to receive grain in loose unbound condition and form the same into a relatively solid stack, and means for depositing the stack on the ground toward the side of the stack former and between the longitudinal median line of the stack former and the transverse median line thereof.

11. In an apparatus for forming and depositing stacks of grain and the like, the combination of a wheeled support, a stack former mounted and transportable thereon and adapted to receive grain in loose unbound condition and form the same into a relatively solid stack, means for depositing the stack at the side of the course of the machine, including pivotal bottom supports arranged in a longitudinal vertical plane which is between a smaller part of the stack former and a larger part of the same, and a substantially vertical pivotal connection between said stack former and its support whereon the stack former may turn in substantially horizontal planes to accommodate itself to the stack while the latter is being deposited.

12. In an apparatus for forming and depositing stacks of grain and the like, the combination of a wheeled support, a stack former mounted on said wheeled support and rotatable thereon in horizontal planes, said stack former having at one side an outwardly and upwardly movable gate, said stack former being adapted to receive grain in loose unbound condition and form the same into a relatively solid stack, and means for lifting that side of the stack which is opposite to said gate, for the deposit of the stack on the ground toward one side of the line of draft.

13. The combination with a grain cutting apparatus, and means for elevating the cut grain and carrying it laterally from the lines of the cutting apparatus, of a straw receiving mechanism having a wheeled support connected to and traveling with the cutting apparatus, a stack former on the wheeled support and rotatable in horizontal planes, an arcuate track at the upper part of the stack former connected to the grain elevating and carrying means, and means for causing the former to deposit the stack toward the side thereof and away from the line of draft.

In testimony whereof, I affix my signature.

DAVID M. GRAHAM.